United States Patent [15] 3,668,229
Berger et al. [45] June 6, 1972

[54] CYANOALKYLESTERALKYLSILANES, AMINO- ALKYLESTERALKYLSILANES, POLYSILOXANES, AND POLISHES FORMED THEREFROM

[72] Inventors: Abe Berger, Schenectady; Jalal S. Jaleel, Albany, both of N.Y.

[73] Assignee: General Electric Company

[22] Filed: Apr. 15, 1970

[21] Appl. No.: 33,139

Related U.S. Application Data

[62] Division of Ser. No. 745,377, July 17, 1968.

[52] U.S. Cl. ............260/448.8 R, 260/46.5 G, 260/448.2 N, 260/448.2 B
[51] Int. Cl. .........................................................C07f 7/18
[58] Field of Search...............260/448.8 R, 448.2 N, 448.2 B

[56] References Cited

UNITED STATES PATENTS 3,584,026  6/1971  Berger et al. .......................260/448.2

*Primary Examiner*—Tobias E. Levow
*Assistant Examiner*—P. F. Shaver
*Attorney*—Robert S. Friedman, William A. Teoli, Frank L. Neuhauser, Oscar B. Waddell and Melvin M. Goldenberg

[57] ABSTRACT

Cyanoalkylesteralkylsilanes within the scope of the formula:

(1)

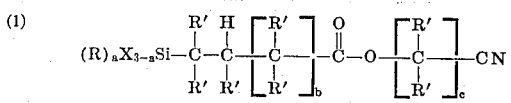

are made by the following reactions:

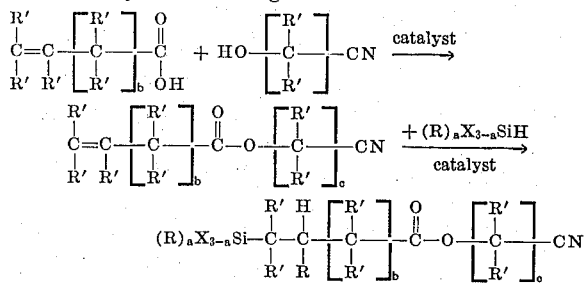

Aminoalkylesteralkylsilanos of the formula:

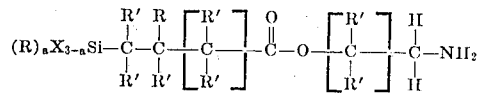

are made by hydrogenating the corresponding nitrile. A compound within the scope of the formula,

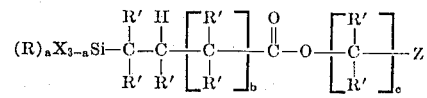

is reacted with a silanol stopped fluid of the formula,

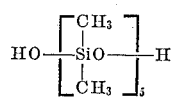

to produce a copolymer containing

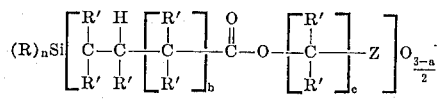

units and

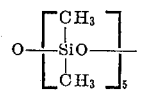

blocks.

In the above formulas, R is an organic radical, R' is an organic radical or hydrogen, X is a hydrolyzable group, Z is a

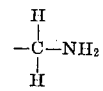

or a -CN radical, $a$ has a value of 0 to 2, $b$ has a value of 0 to 4, and $c$ has a value of one to five. The copolymer containing cyanoalkylesteralkylsilane units is useful as a solvent resistant protective coating material. The copolymer containing aminoalkylesteralkylsilane units is the primary ingredient of a detergent resistant car polish.

8 Claims, No Drawings

CYANOALKYLESTERALKYLSILANES, AMINOALKYLESTERALKYLSILANES, POLYSILOXANES, AND POLISHES FORMED THEREFROM

This application is a division of copending application Ser. No. 745,377 filed July 17, 1968.

This invention relates to organosilicon compounds containing cyanoalkylesteralkyl or aminoalkylesteralkyl radicals attached to silicon and to the use of such compounds. Silanes containing cyanoalkoxyalkyl radicals or aminoalkoxyalkyl radicals, the alkoxy radicals of which are unbranched, are known in the art. These silanes are difficult to prepare, expensive and unstable at elevated temperatures. In addition, by-products produced in the synthesis of these prior art silanes and impurities formed during distillation, which by-products and impurities can be removed only with the greatest difficulty, tend to mask the desirable properties of this class of silane compounds.

In spite of the existence of these prior art silanes, problems continued to exist in the field of detergent resistant polishes, slip resistant polishes, non-wicking silicone furniture polish, and room temperature vulcanizable silicone compositions which cure rapidly without the formation of corrosive by-products. These problems have now been solved by the compositions of the present invention.

When aminoalkylesteralkyl radicals are present in a polysiloxane used in a polish composition, the result is superior to that which is achieved in the absence of the amine containing radicals and there is also improved gloss. A silane containing aminoalkylesteralkyl radicals, and in addition containing hydrolyzable radicals, when mixed with a silanol-stopped fluid forms a composition which cures upon exposure to atmospheric moisture. This reaction is the basis for an entirely new type of detergent resistant polish, and a new type of room temperature vulcanizable adhesive. The aminoalkylesteralkylsilanes and cyanoalkylesteralkylsilanes of present invention are also useful as glass sizing agents and for inorganic filler treating agents.

The silanes of the present invention fall within the formula, (1) 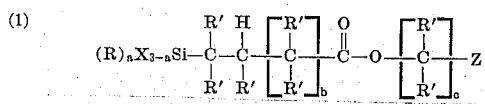

Copolymers of formula 1 with a silanol-stopped polydiorganosiloxane contain the structural unit:

(2) 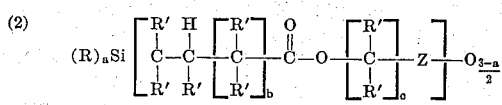

recurring or intercondensed with siloxane blocks having the average formula:

(3) 

In the above formulas and in the formulas that follow Z is selected from the class consisting of

radicals and CN radicals, R is selected from the class consisting of lower alkyl radicals having one to eight carbon atoms, cycloalkyl radicals having five to seven carbon atoms in the ring, mononuclear and binuclear aryl radicals and when Z is CN, R can also be selected from the class consisting of halogenated derivatives of the R radicals defined above; R′ is a radical selected from the class consisting of hydrogen, lower alkyl radicals; cycloalkyl radicals having five to seven carbon atoms in the ring; further radicals where two R′ radicals attached to the same carbon atom, taken together with the carbon atom to which they are attached, form a cycloalkyl radical having five to seven carbon atoms in the ring; and when Z is CN, R can also be selected from the class consisting of halogenated derivatives of the above defined R′ radicals; R″ is selected from the class consisting of lower alkyl radicals, cycloalkyl radicals containing from five to seven carbon atoms in the ring, lower alkenyl radicals, mono and binuclear aryl radicals, mononuclear aryl lower alkyl radicals, lower cyanoalkyl radicals, lower aminoalkyl radicals, lower alkoxy radicals, hydrogen and when Z is CN, R″ can also be selected from the class consisting of halogenated derivatives of the hydrocarbon R″ radicals defined above; X is a hydrolyzable radical selected from the class consisting of lower alkoxy radicals, mononuclear aryloxy radicals, lower dialkyl aminoxy radicals and lower dialkyl amino radicals and when Z is a nitrile radical, X in addition to the above described radicals can be selected from the class comprising halide radicals, isothiocyanato radicals, isonitrile radicals, oximo radicals, lower acyloxy radicals, mercapto lower alkyl radicals, lower dialkyl phospheno radicals etc.; $a$ has a value of 1 to 3, $b$ has a value of zero to 4, $c$ has a value of 1 to 4 and $d$ has a value of 5 to 500.

More specifically, R is a radical selected from the class consisting of lower alkyl radicals having one to eight carbon atoms, e.g., methyl, ethyl, propyl, butyl, octyl, etc. radicals; cycloalkyl radicals having five to seven carbon atoms in the ring, e.g., cyclopentyl, cyclohexyl, cycloheptyl, etc. radicals; mononuclear and binuclear aryl radicals, e.g., phenyl, tolyl, naphthyl, xylyl, biphenyl, etc. radicals; mononuclear aryl lower alkyl radicals, e.g., benzyl, phenylethyl, etc. radicals; and halogenated derivatives of the aforementioned radicals, e.g., chloromethyl, chlorophenyl, dibromophenyl, etc. radicals; R′ is a radical selected from the class consisting of hydrogen; lower alkyl radicals having one to eight carbon atoms, e.g., methyl, ethyl, propyl, butyl, pentyl, heptyl, etc. radicals, cycloalkyl radicals having five to seven carbon atoms in the ring, e.g., cyclopentyl, cyclohexyl, cycloheptyl, etc. radicals; further radicals where two R′ radicals attached to the same carbon atom taken together with the carbon atom to which they are attached, form a cycloalkyl radical having five to seven carbon atoms in the ring, e.g., cyclopentyl, cyclohexyl, cycloheptyl, etc. radicals; and when Z is CN, R′ can also be selected from the class consisting of halogenated derivatives of the aforementioned organic radicals, e.g., chloromethyl, chlorophenyl, dibromophenyl, etc. radicals; R″ is a radical selected from the same class as the R radical and, in addition, can be selected from further radicals including lower cyanoalkyl radicals, e.g., cyanomethyl, cyanoethyl, cyanopropyl, cyanobutyl, etc. radicals; lower aminoalkyl radicals, e.g., aminomethyl, aminoethyl, aminopropyl, aminobutyl, etc. radicals; and lower alkoxy radicals, e.g., methoxy, ethoxy, propoxy, butoxy, etc. radicals; X is a hydrolyzable radical selected from the class consisting of lower alkoxy radicals having one to eight carbon atoms, e.g., methoxy, ethoxy, propoxy, etc. radicals; mononuclear aryloxy radicals, e.g., phenoxy, etc. radicals; lower dialkylamino radicals, e.g., dimethyl amino, diethyl amino, dipentyl amino, etc. radicals and lower dialkylaminoxy radicals, e.g., dimethylaminoxy, dibutylaminoxy, dihexylaminoxy radicals, etc. When Z is CN, X in addition to the above can also be a hydrolyzable radical selected from the class comprising halide radicals, e.g., fluoride, chloride or bromide radicals; isothiocyanato radicals; isonitrile radicals; oximo radicals; lower acyloxy radicals, e.g., acetoxy, etc. radicals; lower dialkylaminoxy radicals, e.g., dimethylaminoxy, dibutylaminoxy, dihexylaminoxy, etc. radicals; lower mercapto alkyl radicals, e.g., methylmercapto, pentylmercapto, octylmercapto, etc. radicals; and lower dialkylphospheno radicals, e.g., dimethylphospheno, diisobutylphospheno, diisoheptylphospheno, etc. radicals.

The prefix "lower" used above and later in the specification in modifying the radicals containing alkyl groups indicates that the alkyl groups contained on the radicals each have eight or fewer carbon atoms.

Cyanoalkylesteralkylsilanes within the scope of the present invention include, for example, compounds represented by the following formulas:

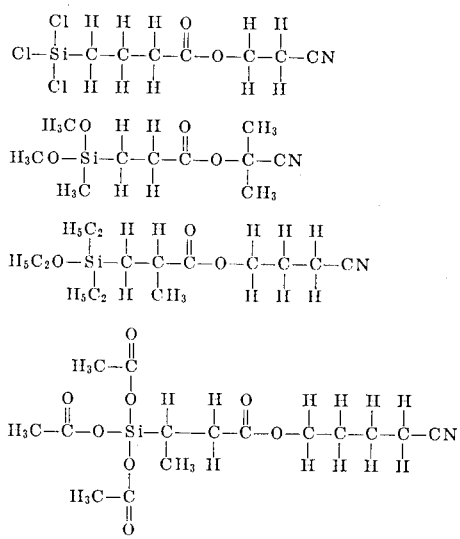

Aminoalkylesteralkylsilanes within the scope of the present invention include, for example, compounds represented by the following formulas:

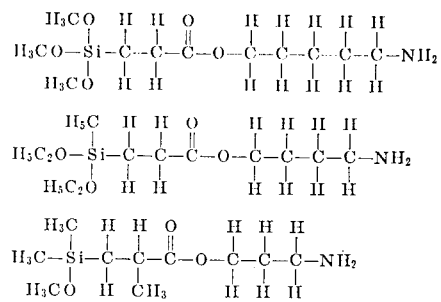

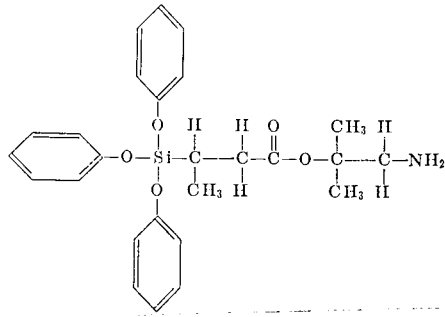

Hydrolysis of the above cyanoalkylesteralkylsilanes either alone or with other cohydrolyzable silane monomers or the reaction of the compounds with silanol containing fluids produce polysiloxanes containing one or more of the following units,

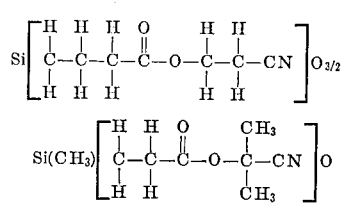

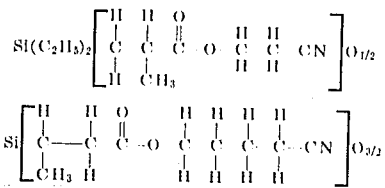

Aminoalkylesteralkylsiloxy units which may be present on the siloxanes of the present invention include,

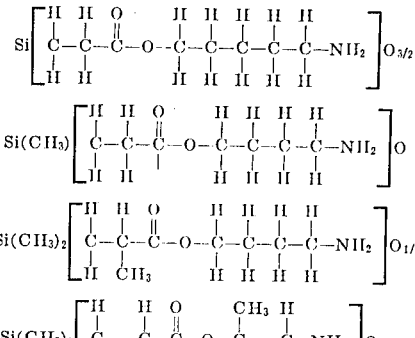

Organopolysiloxanes within the scope of the present invention can contain from one cyanoalkylesteralkyl or one aminoalkylesteralkyl radical per 200 or more silicone atoms or more to one cyanoalkylesteralkyl radical or one aminoalkylesteralkyl radical per silicone atom.

The aminoalkylesteralkyl silanes of the present invention are made by hydrogenating the corresponding cyanoalkylesteralkyl silane. The preferred method for preparing a silane containing a cyanoalkylesteralkyl radical and one or more hydrolyzable radicals is as follows.

An unsaturated carboxylic acid within the scope of the formula,

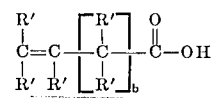

is reacted with an alkylene cyanohydrin within the scope of the formula,

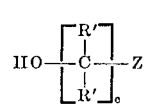

in the presence of an esterification catalyst to produce a cyanoalkylesteralkylene within the scope of the formula,

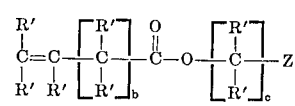

The esterification catalyst used in the reaction is preferably toluene sulfonic acid, however, other esterification catalysts may also be used, such as $HClO_4$, $H_2SO_4$, $BF_3$, $HF$, $AlCl_3$, etc. The cyanoalkylesteralkene is then reacted with a silane within the scope of the formula, $$(R)_a X_{3-a} SiH$$

in the presence of a platinum compound catalyst to produce a cyanoalkylesteralkyl silane of the formula,

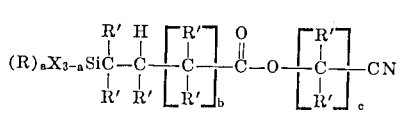

Unsaturated carboxylic acids which can be employed in the above reaction include those having the formulas,

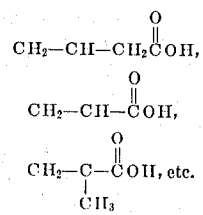

Alkylene cyanohydrins which can be employed in the above reactions include those having the formulas,

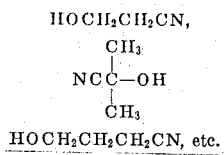

Cyanoalkylesteralkenes which can be employed in the above reaction include those having the formulas,

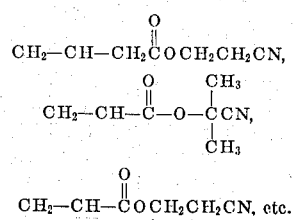

Silanes which can be employed in the above reactions include those having the formulas, $HSiCl_3$,
$HSi(OCH_3)_3$,
$CH_3SiHCl_2$,
$(CH_3)_2(OCH_3)SiH$, The platinum compound catalyst can be selected from that group of platinum compound catalysts which are operative to catalyze the addition of silicon hydrogen bonds across olefinic bonds. Among the many useful catalysts for this addition reaction are chloroplatinic acid as described in U.S. Pat. No. 2,823,218 — Speier et al., the reaction product of chloroplatinic acid with either an alcohol, an ether or an aldehyde as described in U.S. Pat. No. 3,220,972, Lamoreaux, trimethylplatinumiodide and hexylmethyldiplatinum as described in U.S. Pat. No. 3,313,733 — Lamoreaux, the platinum-olefin complex catalysts as described in U.S. Pat. No. 3,159,601 and the platinum cyclopropane complex catalyst described in U.S. Pat. No. 3,159,662 — Ashby.

The SiH-olefin addition reaction may be run at room temperature or temperatures up to 200° C, depending upon catalyst concentration. The catalyst concentration can vary from $10^{-7}$ to $10^{-3}$ and preferably $10^{-5}$ to $10^{-4}$ mole of platinum as metal per mole of molecules containing olefinic unsaturation.

The nitrile radical can then be converted to an amine radical by hydrogenation. The hydrogenation is conducted at from 20 to 400 psi at 50° to 150° C. in the presence of a hydrogenation catalyst such as nickel or cobalt.

The preferred conditions for the hydrogenation reaction are a pressure of 30 to 70 psi, a temperature of 80° to 100° C., and the presence of a Raney nickel catalyst. The catalyst preferably contains no acidic impurities as these interfere with the reaction and cause the formation of undesirable by-products.

It was quite unexpected that the hydrogenation could be accomplished at 30 to 70 psi with little secondary or tertiary amine formation as the usual pressure conditions for this type of reaction are generally in the range of 1,000 to 2,000 psi and in the presence of $NH_3$. The hydrogenation step is represented by the following general equation:

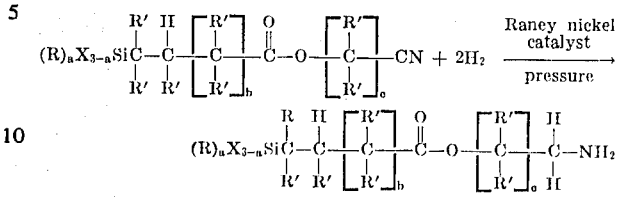

The following examples are illustrative of the polysiloxanes prepared according to the practice of my invention and are not intended for purposes of limitation. All parts are by weight.

The catalyst which was used in SiH-olefin addition reactions in the following examples was a platinum coordinate catalyst formed by the reaction of chloroplatinic acid and octyl alcohol. The preparation of the catalyst solution is disclosed in Example 1 of U.S. Pat. No. 3,220,972 — Lamoreaux. Chemical analysis of this solution showed it to contain 3.5 atoms of chlorine per atom of platinum and 0.035 gram of platinum per gram of solution. In the following examples, unless otherwise indicated, all parts are by weight.

EXAMPLE 1

CYANOETHYL TRIMETHOXYSILYLBUTYRATE

A reaction mixture consisting of 177.5 parts of ethylene cyanohydrin, 215 parts of vinyl acetic acid, 19.7 parts of p-toluene sulfonic acid, and 350 parts of xylene was brought to reflux. The water produced by esterification was azeotropically removed by means of a Dean-Stark trap. The reaction mixture was homogeneous at this state. After a period of 5 hours, 43 parts of water was collected by means of the Dean-Stark trap. Further heating failed to increase the volume of collected water. The acid catalyst, p-toluene sulfonic acid, was then separated from the reaction mixture by filtration. The remaining liquid was then fractionated at reduced pressure. Upon removal of the xylene, the product distilled over at 75° C., at 0.4 mm Hg. A total of 253 parts of cyanoethyl vinylacetate having the formula

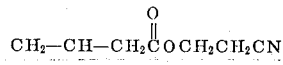

was obtained. To the 253 parts of cyanoethyl vinylacetate was added sufficient platinum coordinate catalyst solution to give an over-all platinum concentration of $10^{-4}$ mole of platinum per mole of olefin present. The reaction mixture was then brought to 90° C. and the drop-wise addition of 222 parts of trimethoxysilane was started. A very exothermic reaction occurred. The external heat source was removed and the reaction temperature was kept at 130° ± 10° C. by adjusting the rate of silane addition. A total of 12 hours was required for complete silane addition, then the reaction was maintained at 120° C. by application of external heat for an additional 2 hours to insure complete reaction. The reaction product was fractionated and the main product, cyanoethyl trimethoxysilylbutyrate of the formula

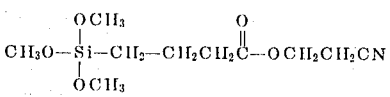

distilled over at 139° C. at 0.4 mm Hg. The amount of product obtained was 420 grams. Its purity by vapor phase chromatographic analysis was better than 99 percent.

EXAMPLE 2

AMINOPROPYL TRIMETHOXYSILYLBUTYRATE

Into a pressure bottle was placed 120 parts of cyanoethyl trimethoxysilylbutyrate and 15 parts of Raney nickel catalyst. The bottle was placed in a Parr hydrogenator and pressured with hydrogen to 55 psi. Shaking was started as the reaction mixture was heated to 80° C. When the pressure dropped to 30 psi, additional hydrogen gas was introduced to bring the pressure back to 55 psi. This hydrogen addition procedure was repeated as required. After a time interval of 7 hours, additional hydrogen was not required to maintain a 55 psi pressure. The pressure on the system was released and a dark reddish brown liquid decanted from the catalyst. On distillation, a total of 40 parts of aminopropyltrimethoxysilylbutyrate of the formula

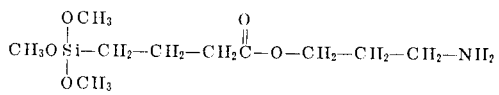

was obtained by having a boiling point of 95° to 97° at 0.3 mm Hg which represented about a 32 percent yield. An IR scan of the distilled product showed the —NH$_2$ absorption at 3.2 microns and 6.5 microns, the

absorption at 5.8 microns and the —OCH$_3$ at 3.55 microns, 8.5 microns, and 9.3 microns, typical of the proposed structure. There was no indication of nitrile absorption indicating completeness of the reaction.

EXAMPLE 3

DETERGENT RESISTANT POLISH

A detergent resistant polish was made by first forming a mixture of one part of aminopropyltrimethoxysilylbutyrate, 1.5 parts of a silanol chain-stopped polydimethylsiloxane having the formula

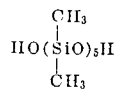

2 parts of a trimethylsilyl end-stopped polydimethylsiloxane oil having a viscosity of 10,000 centistokes at 25° C., 2 parts of a sorbitan monooleate emulsifier, 0.2 parts of a polyoxyethylene sorbitan monooleate emulsifier, 20 parts mineral spirits, and 15 parts kerosene. After these components were thoroughly mixed, 50.3 parts of water was added with high shear agitation to form an emulsion. To this emulsion was then added 8.0 parts of aluminum silicate to produce a combination cleaner polish emulsion. The polish formed was applied to an automobile. The polish had good rub-out and depth of gloss. The automobile was driven through the entire term of an upstate New York winter, which resulted in the automobile being salt encrusted quite frequently. During the course of the winter, the automobile was given 15 detergent washes. The film formed by the detergent resistant polish showed but slight damage the following spring.

EXAMPLE 4

PREPARATION OF CYANOETHYL METHYLDICHLOROSILYBUTYRATE

A reaction mixture containing 139 parts of cyanoethyl vinylacetic acid having a platinum concentration of 10$^{-4}$ mole Pt/mole olefin present is heated to 100° C. To the mixture is added dropwise 115 parts of methyldichlorosilane. A very ex- othermic reaction occurs. The reaction temperature is maintained at 110°–120° C. by rate of silane addition. Following complete addition, the reaction is kept at 120° C. by application of external heat. A VPC scan of the reaction at this stage shows the presence of a high boiling adduct. Upon fractionation the product distills over and IR and hydrolyzable chloride confirm the product identity as cyanoethyl methyldichlorosilylbutyrate of the formula:

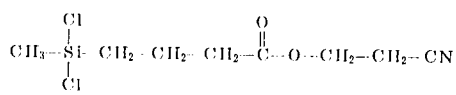

EXAMPLE 5

PREPARATION OF CYANOETHYL TRIMETHOXYSILYLMETHACRYLATE

A mixture containing 140 parts of cyanoethyl methacrylate having a platinum concentration of 10$^{-4}$ mole Pt/mole olefin is heated to 120° C. To the mixture is added dropwise 133 parts of trichlorosilane. A vigorous exotherm develops. The reaction temperature is maintained at 115°–130° C. by rate of silane addition. After 8 hours of silane addition, the heat generated by the reaction is no longer sufficient to maintain the desired temperature, and external heat is applied to attain a temperature in the order of 110°–130°. After complete addition, which requires a total of 12 hours, the reaction is kept at 130° for an additional 4 hours. Upon fractionation, the product is obtained as a colorless liquid and its structure is confirmed by NMR, IR and hydrolyzable chloride analysis as cyanoethyl trichlorosilylmethacrylate of the formula:

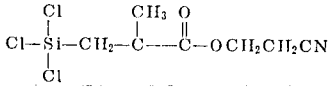

One molar equivalent of the above compound is then added slowly to 3 molar equivalents of methyl orthoformate. A mild exothermic reaction occurs and the evolution of a gas, identified as methyl chloride, occurs. Upon complete addition the reaction is heated to reflux for 2 hours and distilled. The product distills free of hydrolyzable halide. IR shows strong — OCH$_3$ absorption.

What we claim as new and desire to secure by Letters Patent of the United States is:

1. Compounds of the formula

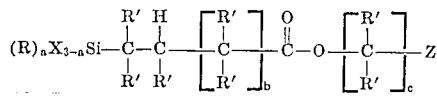

where X is a hydrolyzable group, Z is selected from the class consisting of

and CN radicals, R is selected from the class consisting of lower alkyl radicals having one to eight carbon atoms; cycloalkyl radicals having five to seven carbon atoms in the ring; mononuclear and binuclear aryl radicals and when Z is CN, R can also be selected from the class consisting of halogenated derivatives of the R radicals defined above; R' is a radical selected from the class consisting of hydrogen, lower alkyl radicals; cycloalkyl radicals having five to seven carbon atoms in the ring; further radicals where two R' radicals attached to the same carbon atom, taken together with the carbon atom to which they are attached, form a cycloalkyl radical having five to seven carbon atoms in the ring and when Z is CN, R can also be selected from the class of halogenated derivatives of the above defined organic R' radicals; a has a value of 1 to 4; b has a value of zero to 4; and c has a value of 1 to 4.

2. A compound within the scope of claim 1 having the formula:

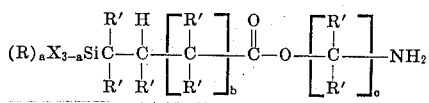

3. A compound within the scope of claim 1 having the formula:

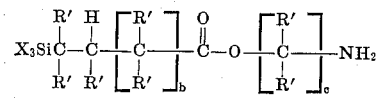

4. A compound within the scope of claim 1 having the formula:

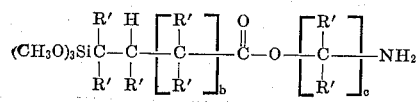

5. A compound within the scope of claim 1 having the formula:

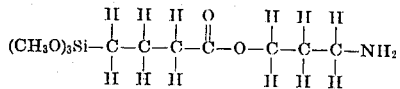

6. A compound within the scope of claim 1 having the formula:

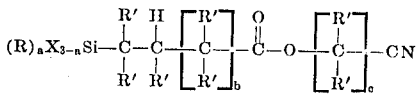

7. A compound within the scope of claim 1 having the formula:

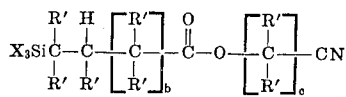

8. A compound within the scope of claim 1 having the formula:

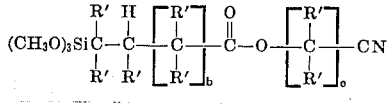

* * * * *